UNITED STATES PATENT OFFICE 2,387,481

BUTADIENE-STYRENE ELASTOMERS

John R. Vincent, Wilmington, Del., assignor to E. I. du Pont de Nemours & Company, Wilmington, Del., a corporation of Delaware No Drawing. Application April 11, 1944,
Serial No. 530,551

2 Claims. (Cl. 260—36)

This invention relates to a method of improving the processability of butadiene-styrene elastomers, and has for its object the addition of materials to the butadiene-styrene elastomers whereby they can be more readily and quickly processed with the machinery ordinarily employed in the processing of natural rubber.

In attempting to replace natural rubber with the synthetic rubbers such as Buna S, GR-S, Hycar OS 10, Hycar OS 20, etc., which are butadiene-styrene elastomers, one of the major problems has been the working of such synthetic elastomers on the usual rubber-working machinery. The working of such synthetic rubbers, even where it is possible to carry it out on the usual rubber machinery, requires excessive time to effect the break-down or to properly compound the same with the necessary compounding materials. Where long periods of working are required to effect the desired result, the volume output per unit of equipment is necessarily low, and the power consumption unduly high.

We have found that the processability of the butadiene-styrene elastomers can be greatly improved if there is incorporated therein from 0.05% to 10% by weight of o-sulfobenzoic anhydride.

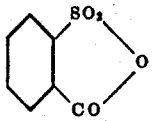

The addition of a small amount of the o-sulfobenzoic anhydride to the butadiene-styrene elastomer has been found to result in a material decrease in the time of milling required to break down the elastomer to a condition satisfactory for the introduction of compounding ingredients. It also results in a substantial decrease in the time required for introducing the compounding ingredients into such elastomer.

The effectiveness of this compound in reducing the milling time of a butadiene-styrene polymer is illustrated in the following data. This data was obtained using a laboratory rubber mill having rolls 6 inches long and 2 inches in diameter, running at the same speed. The rolls were set 0.030 inch apart and were kept at 70°±1° C. during the testing. A sample (50 g.) of the elastomer was milled until a band free of holes, for at least the time required for one revolution of the mill rolls, was obtained. The time required for this was noted. The experiment was then repeated with an identical sample of elastomer, and the o-sulfobenzoic anhydride was added to the elastomer at the beginning of the test, and as quickly as possible. The time to produce a band free of holes was again noted. By comparing the results of such a pair of experiments, the improvement in milling time provided by the o-sulfobenzoic anhydride can be expressed in terms of the percentage reduction in milling time. The following table shows the results obtained, using four different lots of GR-S (the butadiene-styrene elastomer made under the Government's synthetic rubber program), produced by two different manufacturers.

| Manufacturer | Lot No. | Amount of ortho-sulfobenzoic anhydride added | Reduction in milling time |
|---|---|---|---|
| | | Percent | Percent |
| A | 1 | 4 | 50 |
| A | 2 | 4 | 78 |
| B | 1 | 4 | 40 |
| B | 2 | 4 | 32 |

These results show the very large saving in time and in power that may be obtained by using this compound. Further saving in time and power are obtained during the compounding operation, particularly during the incorporation of a carbon black into the elastomer.

The o-sulfobenzoic anhydride is effective at any temperature between 25° and 150° C., and may be introduced and used in an internal mixer, as well as on a mill. It is preferably employed in an amount equal to from 0.5% to 5% by weight of the elastomer. The butadiene-styrene elastomer may contain between 5% and 60% styrene.

I claim:
1. A method for improving the processing characteristics of butadiene-styrene interpolymers containing from 5% to 60% of styrene which comprises intimately incorporating in said interpolymer from 0.5% to 5.0%, based on the weight of the interpolymer, of o-sulfobenzoic anhydride.

2. A millable and readily processable butadiene-styrene interpolymer containing from 5% to 60% of the styrene, having incorporated therein from 0.5% to 5.0%, based on the weight of the interpolymer of o-sulfobenzoic anhydride.

JOHN R. VINCENT.